United States Patent [19]

Scopazzi

[11] 4,369,232
[45] Jan. 18, 1983

[54] DISPERSANTS FOR COATING COMPOSITIONS ISOCYANATOALKYLACRYLATES AS INORGANIC PIGMENT DISPERSANT ON METAL SUBSTRATES

[75] Inventor: Christopher Scopazzi, Wilmington, Del.

[73] Assignee: E. I. Du Pont de Nemours and Company, Wilmington, Del.

[21] Appl. No.: 220,198

[22] Filed: Dec. 23, 1980

[51] Int. Cl.³ .................. B32B 27/40; C08L 27/00
[52] U.S. Cl. .................. 428/425.9; 106/308 F; 106/308 M; 252/316; 252/356; 252/357; 252/358; 427/388.1; 427/388.2; 427/388.5; 428/423.1; 428/425.8; 525/342; 525/380; 525/102; 525/380; 525/328.2; 525/379; 524/441
[58] Field of Search .......... 428/423.1, 463, 522, 428/425.9, 425.8; 260/18 N, 18 PT, 18 TN, 18 S; 252/357, 316, 356, 358; 106/308 F, 308 M; 427/388.2, 388.1, 388.3, 388.5; 525/336, 342, 379, 380

[56] References Cited

U.S. PATENT DOCUMENTS 2,662,027 12/1953 Pike .................. 106/193 R
3,788,996 1/1974 Thompson .................. 252/62.54
3,893,956 7/1975 Brandt .................. 260/18 TN
4,071,487 1/1978 Linden et al. .................. 260/22 TN
4,173,682 11/1979 Noomen et al. .................. 260/18 TN X
4,176,099 11/1979 Pampouchidis et al. ...... 260/18 TN
4,219,632 8/1980 Simms .................. 526/218
4,222,909 9/1980 Brixius et al. .................. 260/18 TN Primary Examiner—Thurman K. Page
Attorney, Agent, or Firm—James H. Ryan

[57] ABSTRACT

Dispersants which improve the gloss of acrylic paints are prepared by reacting the isocyanate groups of monomeric polyisocyanates or isocyanate acrylate polymers with (1) fatty amines, (2) lower alkylamines or alkanolamines and (3), optionally, aminosilanes. A formula for the dispersants may be written as:

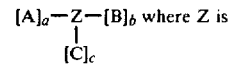

isocyanate residue, A is fatty amine residue with $a=20-80$, B is lower alkylamine or alkanolamine residue with $b=80-20$, and C is aminosilane residue with $c=0-40$, the sum of $a+b+c=100$, the (mole) percentage of isocyanate groups replaced.

38 Claims, No Drawings

DISPERSANTS FOR COATING COMPOSITIONS ISOCYANATOALKYLACRYLATES AS INORGANIC PIGMENT DISPERSANT ON METAL SUBSTRATES

BACKGROUND OF THE INVENTION

1. Field of the Invention

This invention relates to novel compounds useful as dispersants in coating compositions.

2. Prior Art

Pike U.S. Pat. No. 2,662,027 shows aluminum flake in paints and discusses "two-tone" finishes.

Simms U.S. Pat. No. 4,219,632 and Brixius and Simms U.S. Pat. No. 4,222,909, show isocyanatoalkyl acrylate and methacrylate polymers of controlled low molecular weight.

Thompson U.S. Pat. No. 3,788,996 shows coating compositions with film-forming polymers containing known dispersants.

This art is specifically incorporated by reference herein.

BRIEF DESCRIPTION OF THE INVENTION

The novel compounds of this invention are of the type sometimes called "AB" dispersants. Such dispersants have the general formula A—Z—B where Z is an organic linking radical, usually monomeric, and A and B are substituents having different polarities but attached to the same radical. Thus, A can be a hydrophobic radical such as that of a fatty amine. It is then compatible with fat or grease which may be present on aluminum flake or other inorganic pigment. At the same time, B can be a hydrophilic radical containing, for example, a hydroxyl group or even, in this case, a lower alkyl amine and hence compatible with a film-forming polymer used as a dispersing medium. The dispersing agent thus aids in the dispersal of the pigment by helping maintain it in dispersion.

The formula for the compounds of this invention, prepared by the direct interaction of the precursors, may be written as

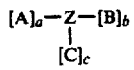

where Z is an organic linking radical resulting from the reaction of a polyisocyanate, generally polymeric, with amines as defined below yielding the moieties A and B and, optionally, C in the ratios a, b and c.

DETAILED DESCRIPTION OF THE INVENTION

As noted, the organic linking radical Z in AB dispersants of the formula given above is generally monomeric. Here, however, it is generally polymeric, resulting, in fact, from the reaction of a polymerized ester of an isocyanatoalkyl acrylic or methacrylic acid having at least 10–25% by weight of isocyanate monomer and a number average molecular weight $M_n$ of 500–10,000 with an amine as defined hereinafter through a urea linkage of the formula

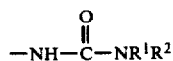

where $R^1$ and $R^2$ are alkyl radicals.

The polymeric isocyanate esters from which Z is derived may be any of those of the Brixius and Simms references noted above. They may be either homopolymers, i.e., of the isocyanatoalkyl esters alone, or copolymers of the esters with one or more other ethylenically unsaturated monomers. The Brixius polymers contain sulfide end groups. The preferred isocyanate ester is isocyanatoethyl methacrylate (IEM).

Any comonomer polymerized with the isocyanate ester in Z is preferably at least one of the group consisting of alkyl acrylates or methacrylates having up to 12 atoms in the alkyl group, styrene, ethylene, and vinyl esters such as vinyl acetate and vinyl chloride. More than one of these comonomers may be used together, if desired. Butyl acrylate and stryrene are preferred comonomers and may be employed simultaneously.

While polymeric isocyanate residues are preferred for the purpose of this invention, it is not restricted thereto. Thus, Z can represent any of the monomeric di-, tri-, etc., polyisocyanates shown by the Thompson patent cited. It is understood, of course, that when the optional component C of the formula is employed, the isocyanate is at least a triisocyanate.

A in the formula is here the amine moiety which results from the reaction of the amine group of a fatty acid amine with isocyanate groups initially on the linking radical Z. The fatty acid amines are the aliphatic amines with aliphatic groups having between 12 and 24 carbons. The higher amines are preferred, e.g., those having between 16 and 24 carbons in the aliphatic groups. These fatty acid amines are available commercially as Kemamines sold by the Humko Sheffield Corporation and described in their literature. Primary amines are preferred but secondary amines can be used. Kemamine P-997 D, distilled soya amine, 97% primary, is preferred.

B in the formula is the amine moiety which results from reaction of the amine group of a lower primary or secondary amine (having up to 6 carbons in the alkyl groups) or of an alkanolamine of up to 6 carbons in the alkanol groups with isocyanate groups originally on Z. Preferred such compounds are butylamines and ethanolamines. Mixtures of various B radicals can be used, if desired, but to no particular purpose.

C in the formula is the optional, but sometimes desirable, amine moiety which results from reaction of the amine group of a primary or secondary aminosilane of the formula

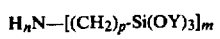

wherein Y is alkyl of up to 6 carbons, m and n are 1 or 2 and the sum of m and n is 3, and p is 6.

All the isocyanate groups of the linking radical should be replaced to insure stability of the product. Consequently, the subscripts a, b and c should total the value 100, representing the mole percentage of isocyanate replaced. For the purposes of this invention, a can vary between 20 and 80 and b can vary between 80 and 20. The aminosilane is optional, and c can vary between 0 and 40.

It will be appreciated that, while the moiety Z in the present compounds is associated with specific moieties A, B and C, it need not be so associated. Thus, it can replace the monomeric polyisocyanates shown by Thompson as forming the linking radical in dispersants. In fact, it can replace these monomeric materials generally in dispersants carrying substituents of differing solubility.

The compounds of the formula above can be prepared very simply by the direct addition of the calculated amounts of the reactants. The reaction is exothermic, however, and reactants should be cooled. Preferably, therefore, the isocyanate-bearing polymer (or other polyisocyanate) is dissolved in a suitable organic solvent such as methyl ethyl ketone and N-methylpyrrolidone and cooled with ice to 5°–10° C. A mixture of the other reactants is added and the reaction allowed to proceed to completion with stirring, e.g., in about an hour. The coreactant amines can be added separately to the isocyanate in calculated amount but nothing is gained by such procedure.

The compounds of this invention are solids or liquids very soluble in organic solvents and, as noted, they tend to stabilize dispersions of inorganic materials in organic solvents. They are particularly useful as dispersants in dispersions containing metal flake or inorganic pigment. They may also be used with dispersions of magnetic oxides such as iron or chromium oxides in organic liquid for magnetic tapes.

Dispersions using the novel compound may be otherwise conventional coating compositions containing pigments. Such compositions are described, for example, in the Thompson patent cited. Thus, polyvinyl chloride, polyvinyl fluoride, etc., compositions can be used. Preferred, however, as with Thompson, are acrylic compositions containing polymers and copolymers of acrylic and methacrylic acids. The acrylic coating compositions of the copending, coassigned application of Khanna and Turner, U.S. Pat. No. 4,276,216, based on acrylate polymers bearing hydroxyl groups and cured with alkylated melamine formaldehyde cross-linking agents are also usable with the present novel dispersants. The Khanna et al. patent is incorporated herein by reference.

The pigment employed can be any of the inorganic materials commonly used as pigments (including carbon). Preferred is aluminum flake, admixed with hydrocarbon and initially in the form of a paste. The hydrocarbon on the surface of the flake provides a coating compatible with the hydrophobic radical A of the dispersants.

The amount of dispersant used in the coating composition depends upon the amount of inorganic pigment present. About 5% by weight based on the weight of the pigment is employed although 1–10% can be used (see Example 3, below). Generally the dispersant is mixed with the pigment before the latter is dispersed but it can be added separately, if desired.

When employed in paints or enamels, dispersants improve the gloss of coatings as described by the term "two-tone" or its synonym "metallic glamour". Metallic glamour can be objectively measured with a special goniophotometer using the following geometrical arrangement. A coated test panel is positioned horizontally within the goniophotometer with the coated side facing up. The light from a circular, concentrated light source is collimated by a lens and is directed to strike the panel at a small angle, typically 22.5°, from the normal. The light beam reflected from the surface of the panel is directed by a second lens, at unity magnification, through a circular aperture having approximately the same diameter as the light source. A photocell is positioned at a distance of about 6–10 aperture diameters behind the aperture and is of sufficient size to intercept all light reflected from the panel through the aperture. The panel can be rotated to different viewing angles about an axis that is defined as the intersection of the plane of the panel and the plane defined by the beam of light incident to and reflected from the panel in its original horizontal position. It has been found particularly useful to measure the intensity of the reflected light at two different panel positions, when the panel has been rotated to positions of +10° and +60° from its initial horizontal position.

The goniophotometer gives unitless numerical readings known as luminous reflectance (G) for each angle from which the panel is viewed. The photocell is calibrated, with respect to the light source, to indicate a luminous reflectance of 100 for a nonmetallic, mattesurfaced, perfect white viewed at any angle setting. Nonmetallic coatings give equivalent reflectance readings from any angle of view.

In a coating having good metallic glamour, the reflectance measured at 10° will be greater than that measured at 60°. The reflectance at a given angle A° is related to another visual characteristic known as lightness (L) through the equation $$L(A°) = 25.29 G(A°)^{\frac{1}{2}} - 18.83$$

Goniophotometry, reflectance, and lightness are generally explained in *The Measurement of Appearance*, Hunter, R. S., John Wiley and Sons, New York (1975).

An objective characterization of the metallic glamour, the flake orientation index (F.O.I.), is in turn expressed as a function of the lightness of the coating at 10° or 60°. The mathematical expression is:

$$F.O.I. = 10 \, \Delta L / \left[ \frac{L(10°) + L(60°)}{2} \right]^{0.6}$$

where $\Delta L = L(10°) - L(60°)$. The denominator of this expression is a normalizing term empirically determined to produce equal F.O.I. values for all coatings having the same metallic glamour, regardless of the color of the coating. It accounts for the color intensity of the coating and the ability of the coating to hide the substrate, both dependent on the amount of chromatic pigment. An index (I or F.O.I.) of at least 40, preferably 45, is desirable.

EXAMPLES

There follow some Examples illustrating this invention together with a preliminary Comparative Example. These differ primarily in that the latter does not employ the dispersant of the invention. In all Examples, ratios, proportions, parts and percentages are in terms of weight and temperatures are in degrees centigrade unless otherwise noted. The dispersants of the invention were tested in acrylate coating compositions of the type shown in the above-mentioned patent of Khanna and Turner.

The following polymers, which form no part of the invention, were employed in the examples:

Polymer I.

This was the polymer methyl methacrylate/butyl acrylate/2-hydroxyethyl acrylate in the proportions 30/38/32: $\overline{M}_n$ = ca. 3,000; Solids = 83% in methyl ethyl ketone (MEK). It may be prepared, for example, as shown in Example 3 of Khanna and Turner.

Polymer II.

This was an isocyanate-containing polymer of the composition methyl methacrylate/butyl acrylate/IEM/lauryl mercaptan residue/azobis(isobutyronitrile) residue in the proportions 56.7/9.6/28.4/2.1/1.6, prepared, e.g., as in Example 1 of the above-identified Brixius and Simms patent: —NCO=7.5% on solids; $\overline{M}_n$=ca. 2,200.

Polymer III.

This was an isocyanate-containing polymer of the composition IEM/styrene/butyl acrylate/lauryl mercaptan residue/azobis(isobutyronitrile) residue in the proportions 53.27/19.1/19.6/7.14/1.01, prepared, e.g., according to the procedure of Example 2 of Brixius and Simms: —NCO=9.94%; $\overline{M}_n$=2,700.

Polymer IV.

This was Polymer I from which substantially all MEK had been distilled off.

Polymer V.

This was similar to Polymer II except that the proportions methyl methacrylate/butyl acrylate/IEM/mercaptan/azo were 24.6/24.2/39.7/10.2/1.3: —NCO=7.48%; $\overline{M}_n$=ca. 12,200.

Polymer VI.

This was similar to Polymer I with the constituents styrene/methyl acrylate/butyl acrylate/hydroxyethyl acrylate/acrylic acid in the proportions 15/14.8/38/32/0.2: $\overline{M}_w$=3,000 and $\overline{M}_n$=1,500 (see Example 5 of Khanna and Turner).

Comparative Example

A. An acrylic enamel solution was prepared as follows:

Acrylic Polymer I (281.86 g) was mixed thoroughly for 20 minutes with a partially methylated/butylated melamine (Resimine ® X-755; Monsanto; 118.8 g) in butyl Cellosolve ® (23.28 g). To this mixture was added aluminum flake pigment dispersion (60.37 g), Monastral ® Blue Pigment dispersion (44.4 g; Monastral ® is a trademark of E. I. du Pont de Nemours and Company), and a fumed silica dispersant (66.75 g). The mixture was stirred for 20 additional minutes and an acid catalyst, p-toluenesulfonic acid (4.4 g), mixed therein over 5 minutes. The final mixture (162 g) was dissolved in MEK (28.83 g) to form a solution having a Zahn No. 2 viscosity of 35 seconds.

B. Solution from A was air sprayed onto two Bonderite ® 40 steel panels (Parker Rust-Proof Co.) on (1) one in two passes to build up a final (after baking) thickness of 1.45 mils and (2) on the other in three passes to build a final thickness of 2.37 mils. The panels were held for 10 minutes at room temperature (21°) and for 10 more at 78° and were cured by baking at 122°. Both panels exhibited a good appearance. When tested goniophotometrically, distinctness of image (DOI) for both panels was 40 (on a scale from 0 to 100, 100 being excellent), and 20° gloss was 62.5 and 61.5, respectively. For the second panel, ΔL=25.13 and FOI=37.36.

EXAMPLE 1

A. Preparation of Dispersant.

To a 250-mil, 4-necked flask fitted with thermometer, ice bath, stirrer, N₂-bubbler, condenser, and addition funnel were charged 100 g of solution of Polymer II (63% by weight of solids in toluene) and 2 g of N-methyl-2-pyrrolidone additional solvent. This mixture was cooled for a 15-minute period and to it was added, through the addition funnel, a 1/1 molar solution in MEK (15.0 g) of ethanolamine (3.43 g) and Kemamine ® P-997D (15.4 g). The —CNO/—NH₂ molar ratio (in the combined amines) was also 1.1. After addition was complete (15–20 minutes), the ice bath was removed and the reaction mixture was allowed to rise to room temperature and was stirred for one hour. Tests showed that all —NCO had reacted. Toluene (27.5 g) was added to make up a 60.81% solids solution of the dispersant.

B. Preparation of Aluminum Flake Dispersion.

Aluminum flake (100 g; Silberline 3141 AR; 70% aluminum particles in mineral spirits) was mixed with MEK (200 ml) for about an hour and filtered to a cake (Solids=64.33%). To methyl Cellosolve ® (15 g) was added 23.32 g of the aluminum cake and 0.2 g of dispersant from A. This mixture was stirred 2–3 hours. Polymer I (72.79 g) was added and stirring was continued for 2½ hours. Properties of the resulting aluminum/acrylic dispersion were: Solids=71.46%; Al=14.3%; Ratio Dispersant/Al=0.8/100.

C. Preparation of Paint.

Polymer I (80.13 g) and Resimine ® X-755 (33.75) were agitated together until thoroughly mixed (20 minutes) and aluminum/acrylic dispersion from B (14.83 g) and Monastral ® Blue Pigment dispersion (44.43 g) were added thereto and mixed for 30 minutes. Butyl Cellosolve ® (11.74 g) and MEK (19 g) were added and mixing continued for 15 minutes. Acid catalyst (1.25 g; 20% p-toluenesulfonic acid) was added and hand-mixed and the mixture reduced to a Zahn No. 2 viscosity of 35 seconds as before with MEK (3 g). The physical properties of the paint were substantially the same as those of the Comparative Example.

D. Testing of Paint.

As in part B of the Comparative Example, paint from C was sprayed on Bonderized ® 40 steel panels. The resultant coatings were held 10 minutes at 21°, 10 at 78° and 30 at 122°. Results are shown in Table I:

TABLE I

| Run | Build (mils) | 20° Gloss | DOI |
|---|---|---|---|
| 1 | 1.55 | 62.5 | 50 |
| 2 | 2.45 | 60.2 | 50 |
| 3 | 1.65 | 60.5 | 50 |
| 4 | 2.45 | 61.3 | 50 |
| 5 | 1.55 | 64.5 | 50 |
| 6 | 2.45 | 63.5 | 50 |

For Runs 1 and 2, ΔL=29.81 and FOI=43.47. For Runs 5 and 6, ΔL=31.01 and I=45.0.

In comparison with the Comparative Example, DOI and FOI are improved by including the dispersant of this invention.

EXAMPLE 2

A. Preparation of Dispersant.

A solution of Polymer III (75 g; 71% by weight of solids in 50/50 ethylene glycol monoethyl ether acetate (Cellosolve ® acetate)/ethyl acetate) and N-methyl-2-pyrrolidone (5 g) were added to a 250-ml flask equipped as before. The solution was cooled in an ice bath and to it was added over 20 minutes a 35/65 molar mixture of ethanolamine (3.85 g) and Kemamine ® P-997D (32.06 g) in MEK (25 g), the temperature rising from 8° to 24°. The temperature was raised to 40° and held for one hour. The product showed: —NCO=0%; Solids=64%; Cellosolve ® acetate=7.88%; Ethyl acetate=7.88%; N-methyl-2-pyrrolidone=3.62%; MEK=16.02%.

B. Preparation of Aluminum Flake Dispersion.

A millbase was made up from the following:

| Ingredient | Weight |
|---|---|
| Washed aluminum flake* | 19.93 |
| Dispersant from A | 1.16 |
| Toluene | 15.66 |

*Silberline as above. Washed aluminum flake is aluminum flake plus excess toluene mixed and filtered.

These three ingredients were mixed for two hours and mixed further with Polymer I (71.39 g) for 2-3 hours. The millbase showed: Solids=72.2%; Al=14.44%.

C. Preparation of Paint.

A paint was made up from the following:

| Ingredient | Weight |
|---|---|
| Polymer I | 256.40 |
| Resimine ® X-755 | 108.00 |
| Butyl Cellosolve ® | 28.00 |
| Monastral ® Blue Dispersion | 40.36 |
| Millbase from B | 47.08 |
| Fumed Silica Dispersion | 59.76 |
| p-Toluene Sulfonic Acid | 4.00 |
| MEK | 65.00 |

The first three ingredients were mixed for 20 minutes and the last five added with stirring, continued for 30 minutes. The product was diluted with methyl ethyl ketone: Viscosity=35 Sec. Zahn No. 2.

D. Testing of Paint.

When the paint of C was sprayed on Bonderized ® steel panels as in Example 1, results were as follows:

TABLE II

| Build (mils) | 20° Gloss | DOI |
|---|---|---|
| 1.1 | 62.3 | 55 |
| 2.1 | 64.8 | 55 |

Appearance was good.

EXAMPLE 3

Example 2 was substantially repeated except that the level of dispersant used in the millbase preparation of Example 2 B, i.e., Dispersant/Al weight ratio=5/100, was raised to A. 20/50 and B. 50/50. The 20° gloss with the composition having the 5/100 ratio was better than with either of the others and was better with the 20/50 ratio than with the 50/50 ratio.

EXAMPLE 4

A. Preparation of Dispersant.

Polymer III (25 g) dissolved in N-methyl-2-pyrrolidone (2 g) and MEK (6 g) was cooled in ice and to it was added, over a 15-20 minute period, a stoichiometric mixture (—NCO/—NH$_2$=1/1) of ethanolamine (0.92 g; 0.25 mol), Kemamine ® P-997D (10.69 g; 0.65 mol) and the aminosilane NH$_2$-(CH$_2$)$_3$-Si(OC$_2$H$_5$)$_3$ (1.33 g; 0.1 mol. This compound is sold by Union Carbide as A-1100.) After the addition of the amines, the reaction mixture was heated to 40°-45° and held at that temperature for an hour. Upon cooling, the solution showed: Solids=41.06%.

B. Preparation of Aluminum Flake Dispersion.

Aluminum paste (21.43 g) and dispersant from A (Solution=1.83 g; Dispersant/Al ratio=5/100) was mixed in methyl Cellosolve ® (12.0 g) for 2-3 hours. The resultant solution showed: Solids=71.42%; Aluminum=14.28%.

C. Preparation of Paint.

Three acrylic enamels were made up as follows:

| Ingredient | Weights (g) 1 | 2 | 3 |
|---|---|---|---|
| Polymer I | 70.51 | — | — |
| Polymer IV | — | 64.72 | 64.72 |
| Resimine ® X-755 | 29.70 | 29.70 | 29.70 |
| Butyl Cellosolve ® | 5.87 | 5.87 | 5.87 |
| Monastral ® Blue Dispersion | 10.96 | 10.96 | 10.96 |
| Al flake from B | 13.09 | 13.09 | — |
| Al flake from Ex. 2B | — | — | 12.95 |
| Fumed Silica Dispersant | 18.58 | 18.58 | 18.58 |
| p-Toluenesulfonic Acid | 1.10 | 1.10 | 1.10 |
| Butanol | — | 15.51 | 15.51 |
| Isopropanol | — | 5.79 | 5.79 |
| MEK | 10.0 | — | — |

The first four ingredients named were mixed for thirty minutes. The next five were added to the mixture with stirring, continued for thirty minutes, and the last three added and mixed for five minutes. Paints were diluted with: (1) 11 g of MEK (Vis.=35 Sec. No. 2 Zahn); (2) 18 g of isopropanol (Vis.=36); and (3) 18 g of isopropanol (Vis.=54.5). In all cases, P/B (Pigment/Binder)=4.7/100, Al/Binder=1.7/100, and Blue Pigment/Binder=2/100.

D. Testing of Paint.

Paint was sprayed on Bonderized ® panels as in Example 1D. Results are shown in Table III:

TABLE III

| Paint | Build (mils) | 20° Gloss | DOI | ΔL | FOI |
|---|---|---|---|---|---|
| 1 | 1.35 | 73.3 | 65 | — | — |
| 1 | 2.24 | 73.0 | 65 | 26.12 | 46.2 |
| 2 | 1.31 | 71.9 | 65 | — | — |
| 2 | 2.03 | 72.8 | 60–65 | 31.02 | 50.4 |
| 3 | 1.31 | 70.3 | 55 | — | — |

EXAMPLE 5

A. Preparation of Dispersant.

A solution of Polymer V (90 g in 10 g of MEK and 5 g of N-methyl-2-pyrrolidone) was added to a 250-ml flask equipped as before. The solution was cooled in ice with nitrogen bubbled through and to it was added Kemamine P-997D (28.51 g); n-butylamine (4.1 g; in the mole ratio 60/40) and MEK (35 g). After the addition was complete, the solution was heated to 40°-45° and held there for an hour. Upon cooling: Wt. Solids=50.80%; —NCO=0.

B. Preparation of Aluminum Flake Dispersion.

Aluminum flake (25 g), Polymer V (1.47 g) and Polymer VI (73.06 g) were mixed in methyl Cellosolve ® (35.50 g) for 2 hours. The resultant solution showed: Solids=57.13%; Al=11.43%).

C. Preparation and Testing of Paint.

An acrylic enamel was made up as follows:

| Ingredient | Weight |
|---|---|
| Polymer VI | 571.18 g |
| Resimine ® X-755 | 300.00 g |
| Blue Millbase | 164.6 g |
| Red Millbase | 24.2 g |
| Green Millbase | 25.1 g |

-continued

| Ingredient | Weight |
|---|---|
| Fumed Silica Dispersant | 168.9 g |

The first two ingredients and the next four were separately mixed and then mixed together. The resultant mixture (87.71 g) was further mixed with aluminum flake from B and p-toluenesulfonic acid (0.70 g) in xylene (10.02 g) and higher boiling aromatic hydrocarbon (19.21 g).

When the paint was sprayed onto a Bonderized ® steel panel to a thickness of 2.01 mils, the following properties were found: 20° Gloss=70.3; DOI=65; MOI=50.67; ΔL=35.17.

Having described my invention, I claim:

1. A composition of the formula

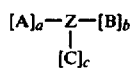

A, B and C are connected to Z by urea linkages,

Z is the residue of a polyisocyanate, it being understood that Z is at least a triisocyanate when all of A, B and C are present, A is the residue which results from the removal of amino hydrogen from a primary or secondary fatty acid amine of 12–24 carbon atoms in the fatty acid groups;

B is the residue which results from the removal of amino hydrogen from a primary or secondary alkyl amine or alkanolamine of up to 6 carbon atoms in the alkyl or alkanol groups;

C is the residue which results from the removal of amino hydrogen from a primary or secondary aminosilane of the formula

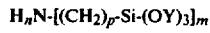

wherein

Y is alkyl of 2–6 carbon atoms, m and n are each 1 or 2 and the sum of m and n is 3, and p is 2–6; and a is 20–80, b is 80–20, and c is 0–40, the sum of a, b and c being 100, the mole percentage of —NCO groups replaced on Z.

2. A composition of claim 1 wherein Z is the residue which results from the removal of the —NCO groups from the polymer of a number average molecular weight of 500–10,000 produced by reacting at least 10% by weight of an isocyanatoalkyl acrylate or isocyanatoalkyl methacrylate alone or with at least one other polymerizable monomer selected from the group consisting of alkyl acrylates and methacrylates having 1–12 carbon atoms in the alkyl group; styrene; ethylene; vinyl acetate; and vinyl chloride.

3. A composition of claim 2 wherein Z has terminal sulfide groups.

4. A composition of claim 2 wherein Z is the residue of an isocyanatoethyl methacrylate polymer.

5. A composition of claim 2 wherein Z is the residue of an isocyanatoethyl methacrylate/butyl acrylate polymer.

6. A composition of claim 2 wherein Z is the residue of an isocyanatoethyl methacrylate/butyl acrylate/methyl methacrylate polymer.

7. A composition of claim 2 wherein Z is the residue of an isocyanatoethyl methacrylate/butyl acrylate/styrene polymer.

8. A composition of claim 2 wherein Z is the residue of an isocyanatoethyl methacrylate/styrene polymer.

9. A composition of claim 2 wherein A is the residue of a soya primary amine.

10. A composition of claim 2 wherein B is the residue of ethanolamine.

11. A composition of claim 2 wherein B is the residue of a butyl amine.

12. A composition of claim 2 wherein C is the residue of $NH_2(CH_2)_3Si(OC_2H_5)_3$.

13. A composition of claim 2 wherein Z is the residue of a methyl methacrylate/butyl acrylate/isocyanatoethyl methacrylate polymer, A is the residue of soya oil primary amine, and B is the residue of ethanolamine.

14. The composition of claim 13 wherein the mole ratio A/B is 1/1.

15. A composition of claim 2 wherein Z is the residue of isocyanatoethyl methacrylate/styrene/butyl acrylate polymer, A is the residue of a soya oil primary amine, and B is the residue of ethanolamine.

16. The composition of claim 15 wherein the mole ratio A/B is 65/35.

17. A composition of claim 2 wherein Z is the residue of a isocyanatoethyl methacrylate/styrene/butyl acrylate polymer, A is the residue of a soya oil primary amine, B is the residue of ethanolamine and C is the residue of $NH_2(CH_2)_3Si(OC_2H_5)_3$.

18. A composition of claim 17 wherein the mole ratio A/B/C is 65/25/10.

19. A composition of claim 2 wherein Z is the residue of isocyanatoethyl methacrylate/methyl methacrylate/butyl acrylate polymer, A is the residue of a soya oil primary amine and B is the residue of a butyl amine.

20. The composition of claim 19 wherein the mole ratio A/B is 60/40.

21. A dispersion comprising:
   A. an organic liquid carrier;
   B. an inorganic pigment dispersed in the carrier; and
   C. a composition of claim 1 also dispersed in the carrier and acting as a dispersant for the inorganic pigment.

22. The dispersion of claim 21 comprising also a binder dissolved in the liquid carrier.

23. A dispersion of claim 22 wherein the binder is an acrylic polymer.

24. A dispersion of claim 23 wherein the pigment is aluminum flake.

25. A dispersion comprising:
   A. an organic liquid carrier;
   B. a binder dispersed in the carrier;
   C. aluminum flake dispersed in the carrier; and
   D. a composition of claim 13, 15, 17 or 19 also dispersed in the carrier and acting as a dispersant for the aluminum flake.

26. A substrate carrying a cured coating containing an inorganic pigment and a composition of claim 1.

27. A substrate of claim 26 wherein the pigment is aluminum flake.

28. A metal substrate carrying a cured coating containing an inorganic pigment and a composition of claim 1.

29. A steel substrate carrying a cured coating containing an inorganic pigment and a composition of claim 1.

30. A steel substrate carrying a cured coating containing flake aluminum and the composition of claim 13, 15, 17 or 19.

31. The process of preparing a composition of matter which comprises reacting the polymer of a number average molecular weight of 500–10,000 produced by reacting at least 10% by weight of an isocyanatoalkyl acrylate or isocyanatoalkyl methacrylate alone or with at least one other polymerizable monomer selected from the group consisting of alkyl acrylates having 2–12 carbon atoms in the alkyl group; alkyl methacrylates having 1–12 carbon atoms in the alkyl group; styrene; ethylene; vinyl acetate; and vinyl chloride;

a primary or secondary saturated fatty acid amine of 6–24 carbon atoms in the fatty acid groups; and a primary or secondary alkyl amine or alkanolamine of up to 6 carbon atoms in the alkyl or alkanol groups.

32. The process of claim 31 carried out with cooling.

33. The process of claim 31 wherein the polymerized ester, the fatty acid amine and the lower alkyl amine or alkanolamine are reacted simultaneously.

34. The process of claim 31 wherein the polymerized ester is reacted first with one co-reactant and then with the other.

35. The process of claim 31 wherein a primary or secondary aminosilane is also reacted.

36. The process of claim 35 wherein all the reactants are reacted simultaneously.

37. A composition of claim 1 wherein A is the residue of a soya oil fatty amine and B is the residue of a primary or secondary alkyl amine of up to 6 carbon atoms in any alkyl group.

38. A composition of claim 37 wherein any alkyl group is butyl.

* * * * *